(12) United States Patent
Savant et al.

(10) Patent No.: US 9,151,320 B2
(45) Date of Patent: Oct. 6, 2015

(54) VEHICLE HANDLE WITH IMPROVED UNLOCKING MECHANISM

(75) Inventors: Fiorenzo Savant, Santena (IT); Marco Savant, Santena (IT)

(73) Assignee: VALEO S.p.A., Santena To (IT)

( * ) Notice: Subject to any disclaimer, the term of this patent is extended or adjusted under 35 U.S.C. 154(b) by 597 days.

(21) Appl. No.: 13/121,748

(22) PCT Filed: Sep. 11, 2009

(86) PCT No.: PCT/EP2009/061799
§ 371 (c)(1),
(2), (4) Date: May 2, 2011

(87) PCT Pub. No.: WO2010/037622
PCT Pub. Date: Apr. 8, 2010

(65) Prior Publication Data
US 2011/0204662 A1 Aug. 25, 2011

(30) Foreign Application Priority Data
Oct. 2, 2008 (IT) .............................. MI2008A1754

(51) Int. Cl.
E05B 3/00 (2006.01)
F16C 1/16 (2006.01)
E05B 85/16 (2014.01)
E05B 79/20 (2014.01)
E05B 77/06 (2014.01)

(52) U.S. Cl.
CPC . *F16C 1/16* (2013.01); *E05B 79/20* (2013.01); *E05B 85/16* (2013.01); *E05B 77/06* (2013.01)

(58) Field of Classification Search
USPC .............. 74/489, 502.2, 488; 292/336.3, 347, 292/DIG. 8, DIG. 22, DIG. 65; 16/412; 188/2 D, 265, 72.9
See application file for complete search history.

(56) References Cited

U.S. PATENT DOCUMENTS

| 4,019,402 | A | | 4/1977 | Leonheart | |
|---|---|---|---|---|---|
| 4,889,373 | A | * | 12/1989 | Ward et al. ................ | 292/336.3 |
| 5,681,068 | A | * | 10/1997 | Kleefeldt et al. .......... | 292/336.3 |
| 6,062,615 | A | * | 5/2000 | Hunt et al. ................ | 292/336.3 |
| 6,264,257 | B1 | * | 7/2001 | Meinke ..................... | 292/336.3 |
| 8,333,415 | B2 | * | 12/2012 | Chang et al. .............. | 292/336.3 |
| 8,616,611 | B2 | * | 12/2013 | Schidan et al. ............ | 296/146.7 |
| 2006/0163887 | A1 | | 7/2006 | Savant | |

(Continued)

FOREIGN PATENT DOCUMENTS

| BE | 474 088 A | | 7/1947 |
|---|---|---|---|
| CH | 248133 A | * | 4/1947 |
| DE | 3713100 A1 | * | 11/1988 |

(Continued)

OTHER PUBLICATIONS

International Search Report from PCT/EP209/061799 dated Nov. 6, 2009 (3 pages).

*Primary Examiner* — Alyson M Merlino
(74) *Attorney, Agent, or Firm* — Osha Liang LLP

(57) ABSTRACT

Vehicle handle, which comprises a lever (2) which can rotate around a first axis (4) and is mechanically connected to a first rocker (9) which can rotate around a second axis (10) when the lever (2) rotates around the first axis (4) for pulling a cable (11) which can slide in a duct (12) mechanically connected to the lever (2), so that the duct (12) moves in the direction opposite to the direction (32) of the cable (11) when the lever (2) rotates around the first axis (4).

18 Claims, 6 Drawing Sheets

(56) References Cited

U.S. PATENT DOCUMENTS

2008/0036219 A1\* 2/2008 Savant et al. ............... 292/336.3
2010/0325841 A1\* 12/2010 Savant et al. .................... 16/412

FOREIGN PATENT DOCUMENTS

| DE | 203 07 750 | U1 | | 9/2004 |
|----|------------|----|----|--------|
| EP | 375275 | A2 | \* | 6/1990 |
| EP | 1 556 569 | A1 | | 7/2005 |
| FR | 409 914 | A | | 3/1909 |
| FR | 21956 | E | \* | 4/1921 |
| FR | 863 609 | A | | 4/1941 |
| FR | 970866 | A | \* | 1/1951 |
| FR | 2876811 | A1 | \* | 4/2006 |
| GB | 266079 | A | \* | 2/1927 |
| WO | 2004/042177 | A1 | | 5/2004 |

\* cited by examiner

VEHICLE HANDLE WITH IMPROVED UNLOCKING MECHANISM

BACKGROUND OF THE INVENTION

The present invention relates to a vehicle handle, and in particular to a handle with an improved unlocking mechanism which is driven when the lever of the handle is pulled for opening the door of a motor vehicle.

EP 1556569 discloses a vehicle handle, which comprises a lever mechanically connected to a rocker which rotates together with the lever for pulling a cable which drives the unlocking mechanism of the door of a motor vehicle.

The stroke of the cable depends on its distance from the rotation axis of the rocker, so that the size of the rocker cannot be reduced without reducing the stroke of the cable, which however depends in turn on the unlocking mechanism.

It is therefore an object of the present invention to provide a handle, which is free from said disadvantages.

Thanks to the mechanical connection between the lever and the duct containing the cable, the duct moves in the direction opposite to the direction of the cable when the lever rotates around the first axis, so as to increase the stroke of the cable in the duct without changing the size of the rocker.

Said mechanical connection is preferably carried out with a particular second rocker which rotates in the direction opposite to the first, so as to obtain a handle compact and reliable, especially when the rockers rotate around substantially parallel axes.

BRIEF DESCRIPTION OF THE DRAWINGS

Further advantages and features of the handle according to the present invention will become clear to those skilled in the art from the following detailed and non-limiting description of an embodiment thereof with reference to the attached drawings, wherein.

DETAILED DESCRIPTION

Figure 1:
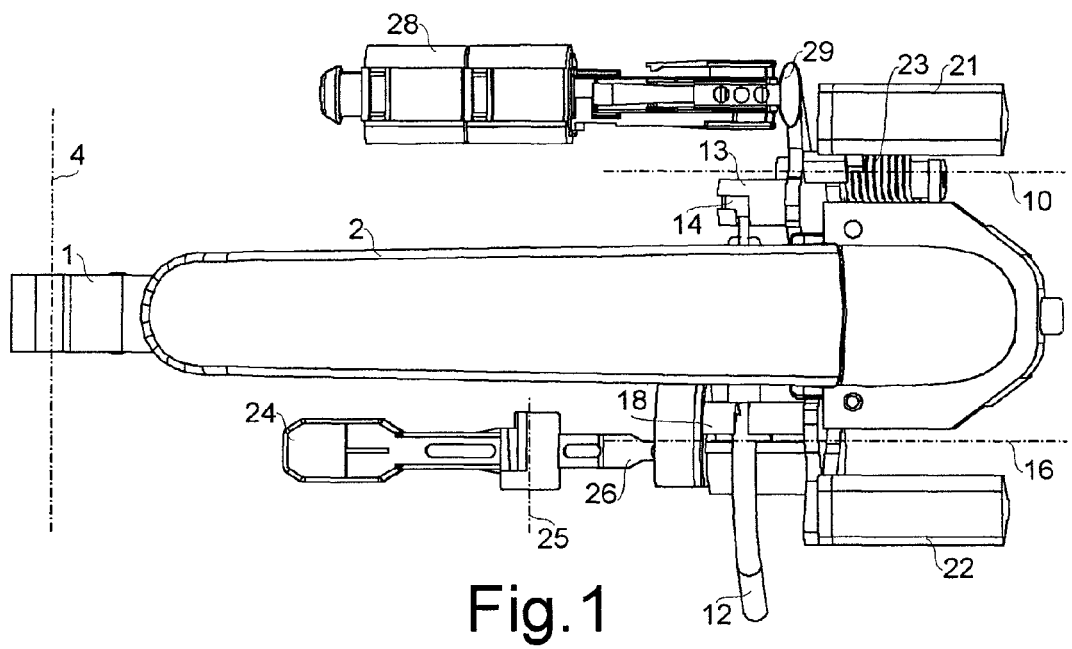
FIG. 1 shows a front view of the handle in a rest position.
Figure 2:
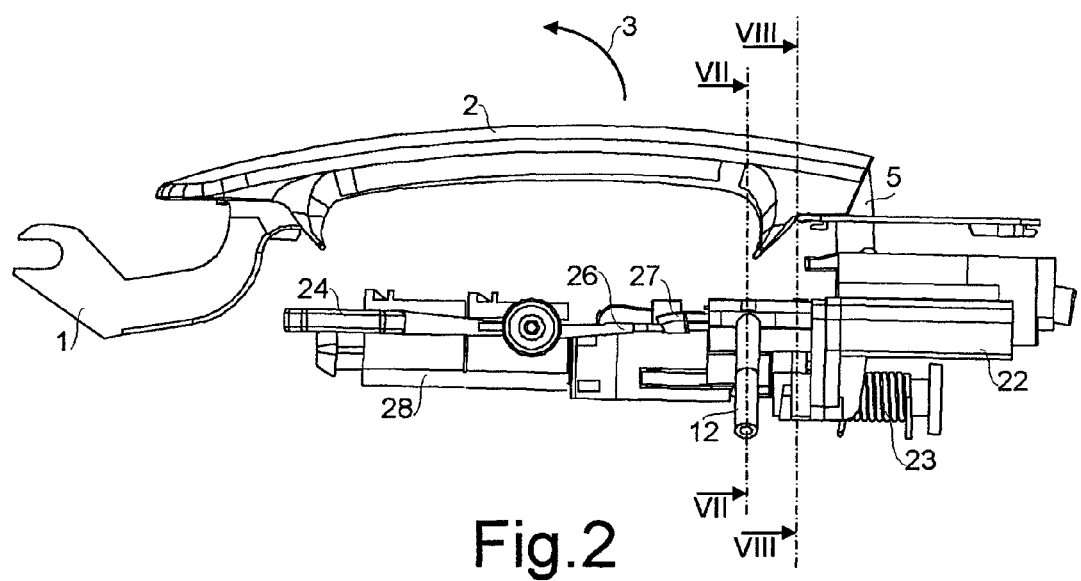
FIG. 2 shows a bottom view of the handle of FIG. 1.
Figure 3:
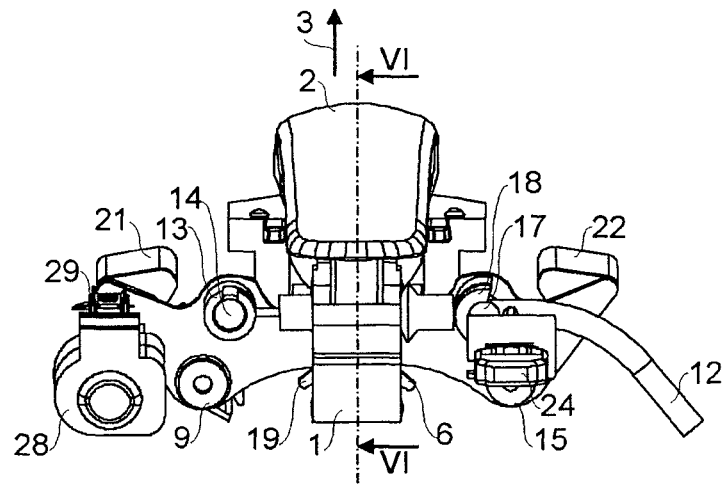
FIG. 3 shows a side view of the handle of FIG. 1.
Figure 4:
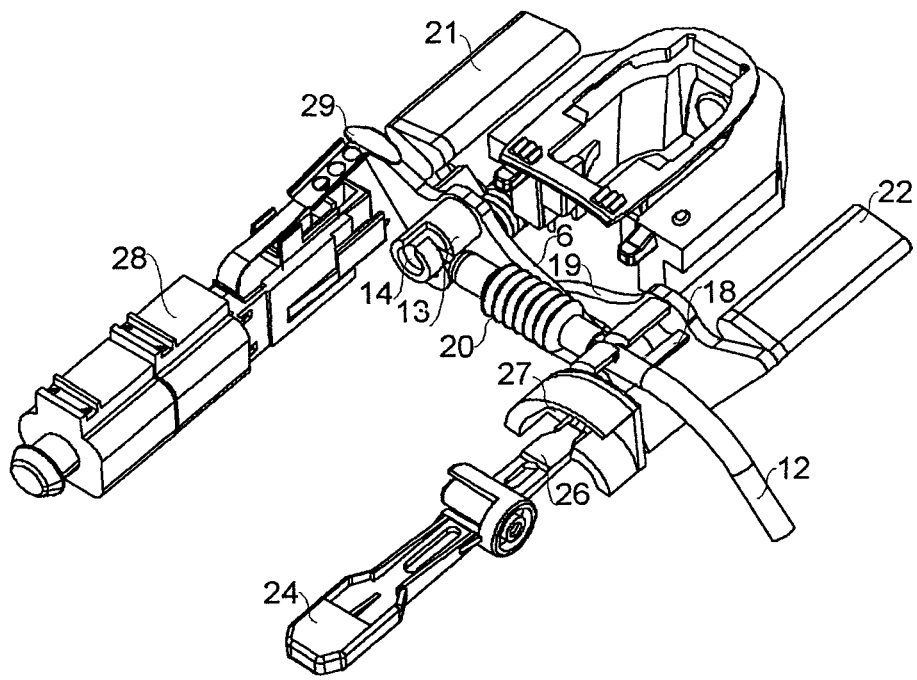
FIG. 4 shows a first perspective view of the handle of FIG. 1 without the lever.
Figure 5:
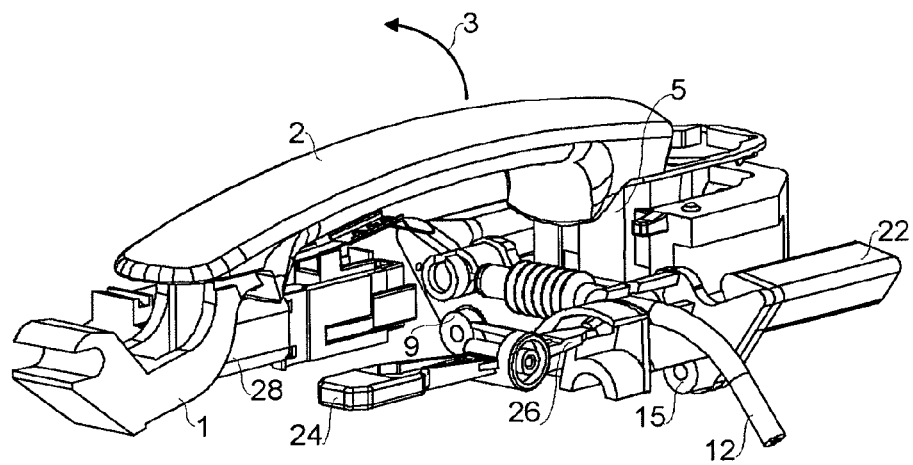
FIG. 5 shows a second perspective view of the handle of FIG. 1 with the lever.
Figure 6:
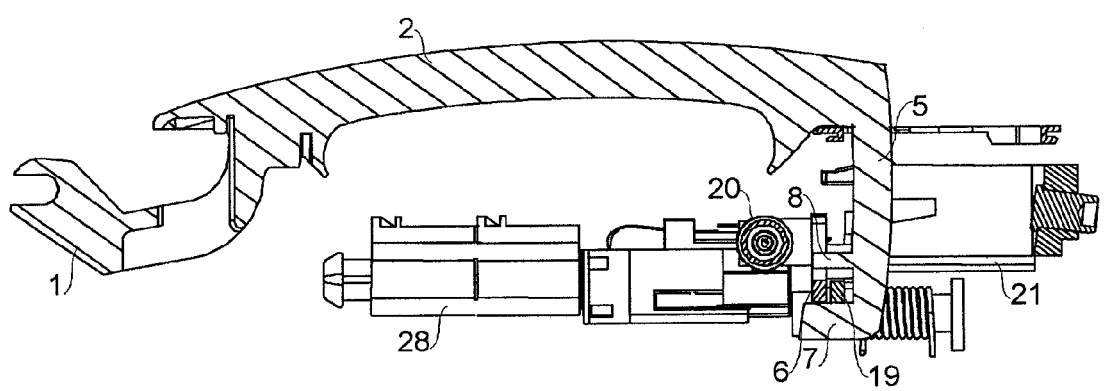
FIG. 6 shows section VI-VI of FIG. 3.
Figure 7:
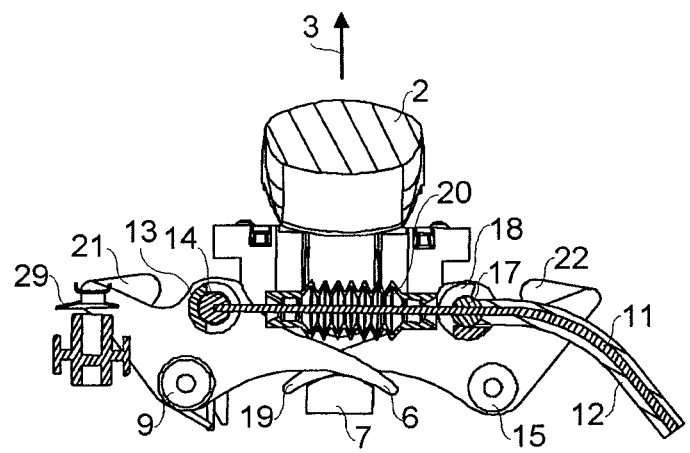
FIG. 7 shows section VII-VII of FIG. 2.
Figure 8:
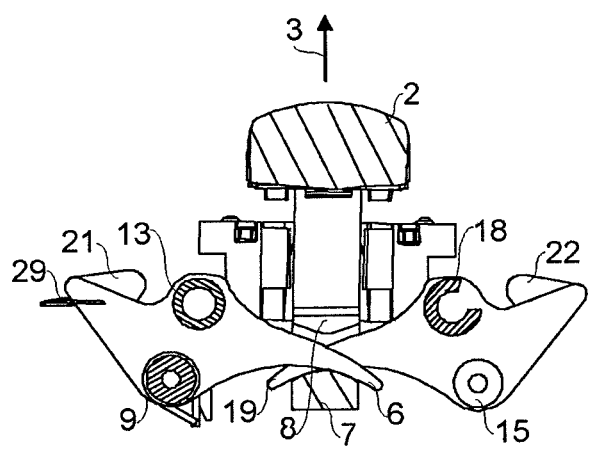
FIG. 8 shows section VIII-VIII of FIG. 2.

Referring to FIGS. 1 to 8, it is seen that the handle according to the present invention comprises in a known way a frame (not shown in the figures) suitable for being fixed for example behind the outer surface of a door (not shown in the figures) of a motor vehicle. The frame is provided with a transversal pin acting as a fulcrum, around which a shaped extension 1 arranged at one end of a lever 2 suitable for being pulled outwards can rotate in the direction of arrow 3 for opening the door. Lever 2 rotates thus around a first axis 4 generally parallel to the rotation axis of the door. The other end of lever 2 is provided with an appendix 5 which protrudes into the frame and comprises a seat in which a first tongue 6 is arranged. Said seat is for example a notch close to one or two projections 7, 8 of appendix 5. First tongue 6 protrudes from a side of a first rocker 9 which can rotate in the frame around a second axis 10 substantially perpendicular to first axis 4. With this arrangement, lever 2 is mechanically connected to first rocker 9, so that the latter rotates around second axis 10 when lever 2 is pulled. In other embodiments of the present invention, second axis 10 can be substantially parallel to first axis 4. First rocker 9 is in turn connected to the unlocking mechanism (not shown in the figures) of the door, so that the latter can be opened by further pulling lever 2. Said connection is carried out by means of a cable 11 which can slide in a duct 12 when it is pulled by a first extension 13 of first rocker 9 during the rotation of the latter. For this purpose, cable 11 is provided with a first head 14 housed in first extension 13 of first rocker 9.

According to the invention, duct 12 is mechanically connected to lever 2, so that duct 12 moves in the direction opposite to cable 11 when lever 2 rotates around first axis 4. In particular, said mechanical connection is carried out by means of a second rocker 15 pivoted to the frame for rotating in the direction opposite to the rotation direction of first rocker 9 when lever 2 rotates around first axis 4. Second rocker 15 can then rotate around a third axis 16 substantially parallel to second axis 10. Duct 12 is provided with a second head 17 housed in a second extension 18 of second rocker 15. Second rocker 15 is provided with a second tongue 19 mechanically connected to appendix 5 of lever 2, in particular arranged in the seat of appendix 5 in which the first tongue 6 of first rocker 9 is arranged.

The surface of first tongue 6 and of second tongue 19 contacting protrusion 7 of the seat of appendix 5 is concave, while the surface of protrusion 7 of the seat contacting first tongue 6 and second tongue 19 is convex. A muff 20 covers at least partially the portion of cable 11 comprised between heads 14 and 17. First rocker 9 and/or second rocker 15 are provided with a counterweight 21, 22 arranged on the side opposite to first tongue 6 and/or second tongue 19, respectively, with respect to their rotation axes 10, 16. First rocker 9 and/or second rocker 15 are further provided with elastic means, for example a helical spring 23 coaxially arranged around the rotation axis 10 of first rocker 9, for moving lever 2 and rockers 9, 15 back to the rest position.

An inertial safety device comprises an inertial mass 24 pivoted to the frame for rotating around a fourth axis 25 substantially perpendicular to second axis 10 or third axis 16. Elastic means (not shown in the figures) act on the inertial mass 24 for opposing to its rotation in case of accelerations acting on the latter. A stop member 26 protrudes from inertial mass 24 for intercepting a protrusion 27 projecting from the first rocker 9 or from the second rocker 15, so as to prevent the rotation of second rocker 15, and thus the opening of the door, in case of impact. A sensor 28 detects the rotation of the first rocker 9, in particular of a tooth 29 protruding from the first rocker 9 from the side opposite to the first tongue 6 with respect to second axis 10.

Figure 9:
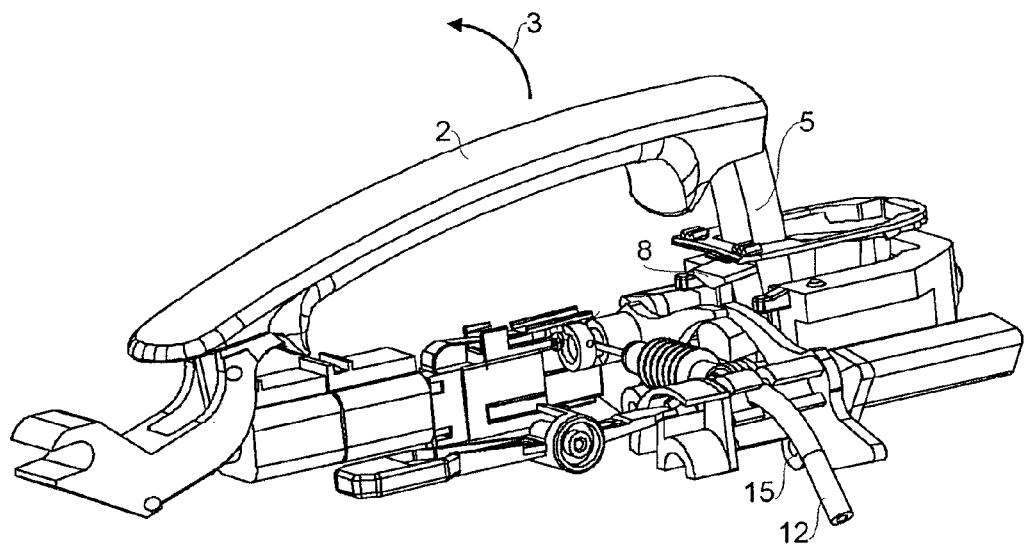
FIG. 9 shows the handle of FIG. 5 with the pulled lever.
Figure 10:
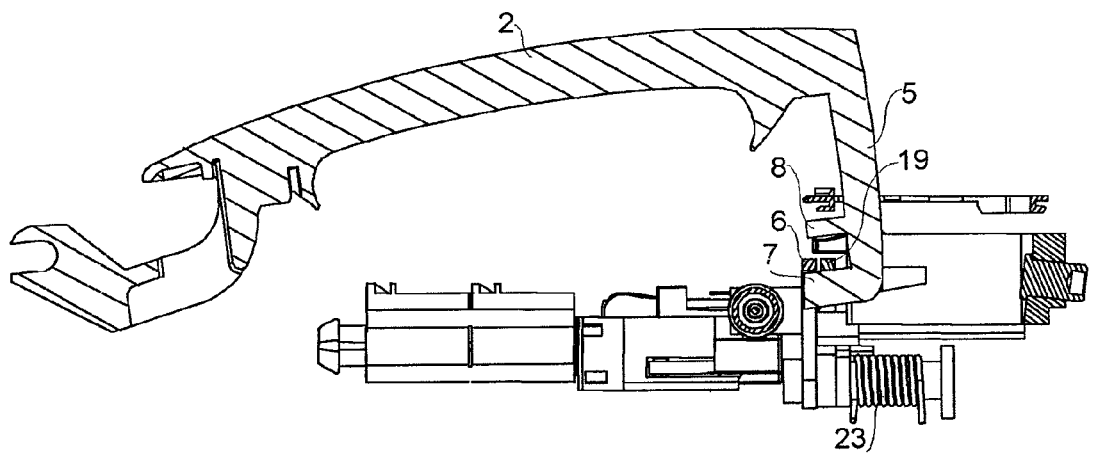
FIG. 10 shows the handle of FIG. 6 with the pulled lever.
Figure 11:
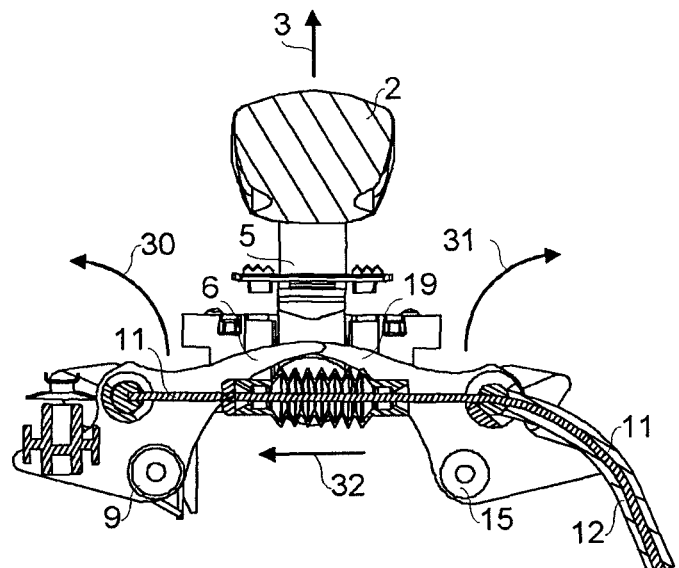
FIG. 11 shows the handle of FIG. 7 with the pulled lever.
Figure 12:
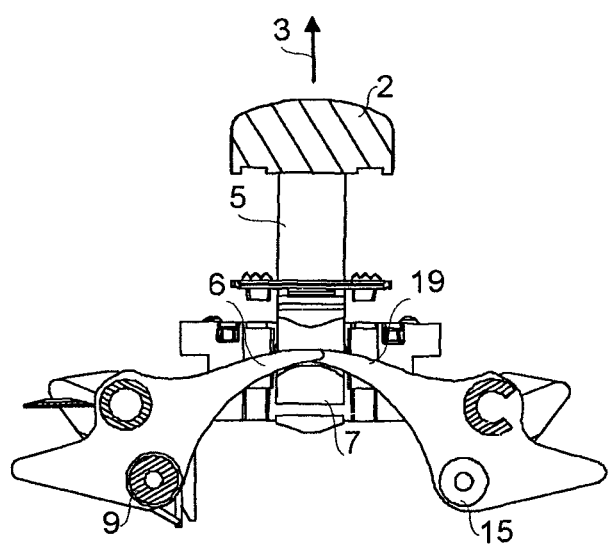
FIG. 12 shows the handle of FIG. 8 with the pulled lever.

Referring also to FIGS. 9 to 12, it is seen that when lever 2 of the handle is pulled by a user in the direction of arrow 3, first tongue 6 and second tongue 19 are pulled in the same direction of lever 2, in particular by first protrusion 7 of the seat of appendix 5, so as to rotate in opposite directions first rocker 9 around second axis 10 in the direction of arrow 30 and second rocker 15 around third axis 16 in the direction of arrow 31. During these opposite rotations of rockers 9 and 15, cable 11 is pulled in the direction of arrow 32 and duct 12 in the opposite direction. When lever 2 is not pulled anymore, helical spring 23 moves lever 2 and rocker 9, 15 back to the rest position.

Possible modifications and/or additions may be made by those skilled in the art to the hereinabove disclosed and illustrated embodiment while remaining within the scope of the following claims.

The invention claimed is:

1. A handle on a door of a motor vehicle for opening the door, comprising:
   a lever coupled to the door of the motor vehicle, the lever configured to rotate around a first axis, wherein the lever is mechanically connected to a first rocker configured to rotate around a second axis when the lever rotates around the first axis for pulling a cable which slides in a duct,
   wherein the duct is mechanically connected to a second rocker configured to rotate around a third axis so that the duct moves in a direction opposite to the direction in which the cable is pulled when the lever rotates around the first axis,
   wherein the first and the second rocker remain in contact with the lever when the lever rotates around the first axis, and
   wherein the second axis is substantially perpendicular to the first axis.

2. The handle on the door of the motor vehicle according to claim 1, wherein the second rocker rotates in a direction opposite to a direction of rotation of the first rocker when the lever rotates around the first axis.

3. The handle on the door of the motor vehicle according to claim 2, wherein the third axis is substantially parallel to the second axis.

4. The handle on the door of the motor vehicle according to claim 1, wherein the lever is provided with an appendix which comprises a seat in which a first tongue protruding from the first rocker is arranged.

5. The handle on the door of the motor vehicle according to claim 4, wherein the second rocker is provided with a second tongue mechanically connected to the appendix of the lever.

6. The handle on the door of the motor vehicle according to claim 5, wherein the second tongue of the second rocker is arranged in the seat of the appendix in which the first tongue of the first rocker is arranged.

7. The handle on the door of the motor vehicle according to claim 2, wherein the cable is provided with a first head housed in a first extension of the first rocker, while the duct is provided with a second head housed in a second extension of the second rocker.

8. The handle on the door of the motor vehicle according to claim 5, wherein surfaces of the first tongue and of the second tongue contacting the seat of the appendix are concave, while a surface of the seat contacting the first tongue and the second tongue is convex.

9. The handle on the door of the motor vehicle according to claim 5, wherein the first rocker and the second rocker are each provided with a counterweight arranged on a side opposite to the first tongue and/or the second tongue, respectively, with respect to the first and third axes.

10. The handle on the door of the motor vehicle according to claim 2, further comprising an inertial mass configured to rotate around a fourth axis substantially perpendicular to the second axis or to the third axis, wherein a stop member projects from the inertial mass for intercepting a protrusion projecting from the first rocker or from the second rocker.

11. A vehicle handle, comprising:
    a lever configured to rotate around a first axis, wherein the lever is mechanically connected to a first rocker configured to rotate around a second axis when the lever rotates around the first axis for pulling a cable which slides in a duct,
    wherein the duct is mechanically connected to a second rocker configured to rotate around a third axis so that the duct moves in a direction opposite to the direction in which the cable is pulled when the lever rotates around the first axis,
    wherein the first and the second rocker remain in contact with the lever when the lever rotates around the first axis,
    wherein the lever is provided with an appendix which comprises a seat in which a first tongue protruding from the first rocker is arranged,
    wherein the second rocker is provided with a second tongue mechanically connected to the appendix of the lever, and
    wherein surfaces of the first tongue and of the second tongue contacting the seat of the appendix are concave, while a surface of the seat contacting the first tongue and the second tongue is convex.

12. The handle according to claim 11, wherein the second rocker rotates in a direction opposite to a direction of rotation of the first rocker when the lever rotates around the first axis.

13. The handle according to claim 12, wherein the third axis is substantially parallel to the second axis.

14. The handle according to claim 11, wherein the second axis is substantially perpendicular to the first axis.

15. The handle according to claim 11, wherein the second tongue of the second rocker is arranged in the seat of the appendix in which the first tongue of the first rocker is arranged.

16. The handle according to claim 12, wherein the cable is provided with a first head housed in a first extension of the first rocker, while the duct is provided with a second head housed in a second extension of the second rocker.

17. The handle according to claim 11, wherein the first rocker and the second rocker are each provided with a counterweight arranged on a side opposite to the first tongue and/or the second tongue, respectively, with respect to the first and third axes.

18. The handle according to claim 12, further comprising an inertial mass configured to rotate around a fourth axis substantially perpendicular to the second axis or to the third axis, wherein a stop member projects from the inertial mass for intercepting a protrusion projecting from the first rocker or from the second rocker.

* * * * *